United States Patent
Newton et al.

[11] Patent Number: 6,088,499
[45] Date of Patent: Jul. 11, 2000

[54] FIBER OPTIC CABLE WITH RIPCORD

[75] Inventors: Katharine Newton; Larry W. Field; Eric R. Logan, all of Hickory, N.C.

[73] Assignee: Siecor Corporation, Hickory, N.C.

[21] Appl. No.: 08/940,327

[22] Filed: Sep. 30, 1997

[51] Int. Cl.[7] .................................................. G02B 6/44
[52] U.S. Cl. ........................ 385/112; 385/106; 385/109
[58] Field of Search .......................... 385/110–113, 100, 385/102–109

[56] References Cited

U.S. PATENT DOCUMENTS

| | | | |
|---|---|---|---|
| 4,038,489 | 7/1977 | Stenson et al. | 350/96.23 |
| 4,435,238 | 3/1984 | Smith | 156/171 |
| 4,909,592 | 3/1990 | Arroyo et al. | 385/113 |
| 4,913,515 | 4/1990 | Braunmiller et al. | 350/96.23 |
| 4,960,318 | 10/1990 | Nilsson et al. | 350/96.23 |
| 4,964,691 | 10/1990 | Nelson et al. | 350/96.23 |
| 5,029,974 | 7/1991 | Nilsson | 350/96.23 |
| 5,165,003 | 11/1992 | Carter | 385/112 |
| 5,173,961 | 12/1992 | Chiasson | 385/113 |
| 5,243,675 | 9/1993 | Kathiresan et al. | 385/109 |
| 5,249,248 | 9/1993 | Arroyo et al. | 385/113 |
| 5,268,971 | 12/1993 | Nilsson et al. | 385/101 |
| 5,268,983 | 12/1993 | Tatarka et al. | 385/106 |
| 5,321,788 | 6/1994 | Arroyo et al. | 385/109 |
| 5,345,525 | 9/1994 | Holman et al. | 385/104 |
| 5,345,526 | 9/1994 | Blew | 385/112 |
| 5,389,442 | 2/1995 | Arroyo et al. | 428/396 |
| 5,542,020 | 7/1996 | Horska | 385/112 |
| 5,621,841 | 4/1997 | Field | 385/113 |
| 5,642,452 | 6/1997 | Gravely et al. | 385/113 |
| 5,838,864 | 11/1998 | Patel et al. | 385/113 |

FOREIGN PATENT DOCUMENTS

0416207A2   5/1990   European Pat. Off. .......... G02B 6/44

OTHER PUBLICATIONS

Northern Telecom six position armored loose tube design, NT–25N2L6–036, Dec. 1991 (drawing).

Northern Telecom six position armored loose tube design, 1996 (drawing), [No Month].

*Primary Examiner*—John D. Lee
*Assistant Examiner*—Juliana K. Kang
*Attorney, Agent, or Firm*—Timothy J. Aberle

[57] ABSTRACT

A fiber optic cable (10) includes a cable core (20) and a sheath section (40). Interstitial assemblies (30) are disposed between cable core (20) and sheath section (40, at least one of the interstitial assemblies (30) includes a ripcord (38). Ripcord (38) is operative, upon application of a sufficient outwardly directed pulling force, to rip a cable core binder (26) stranded around buffer tubes (23), water swellable tape (27), and a binder (29) stranded around tape (27). A craftsman need not use a cutting tool to cut binders (26,29) and/or tape (27) which saves time and avoids potential injury to the craftsman and inadvertent damage to buffer tubes or other cable components.

7 Claims, 2 Drawing Sheets

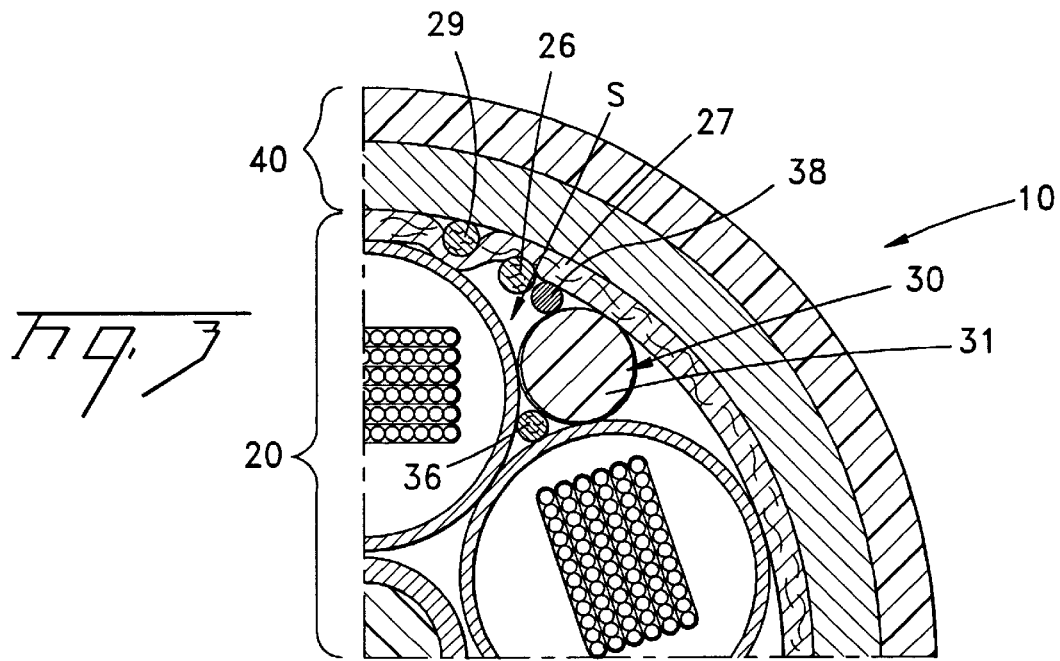
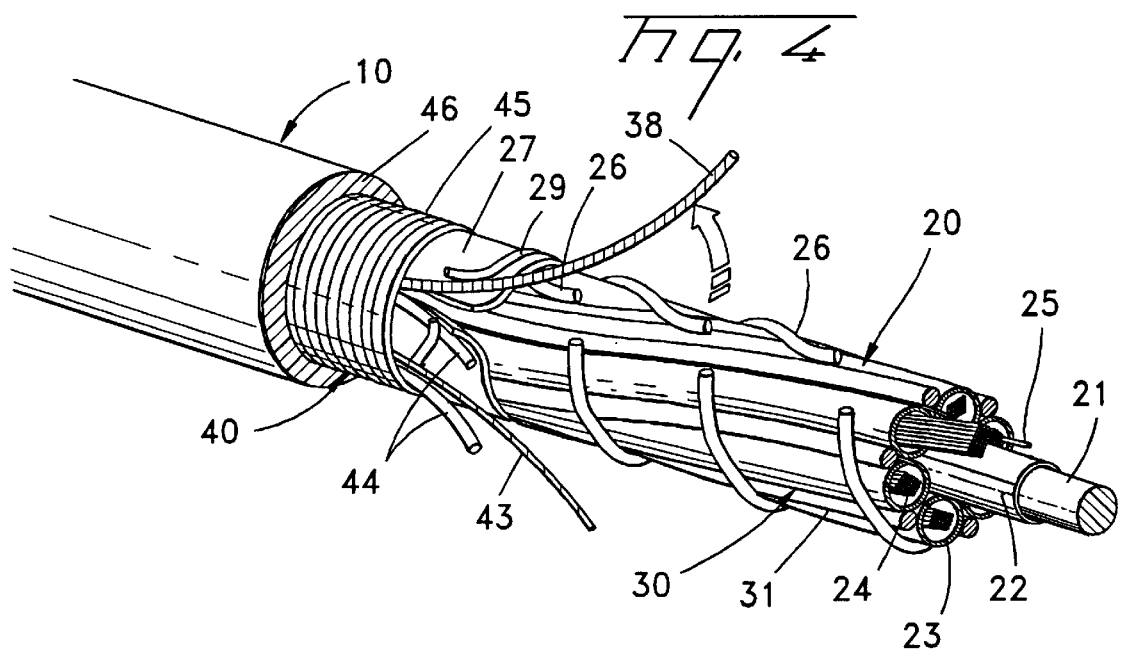

FIBER OPTIC CABLE WITH RIPCORD

The present invention relates to a fiber optic cable, and, more particularly, to a fiber optic cable having a ripcord for ripping at least one fiber optic cable component.

Fiber optic cables include optical fibers which transmit voice, television, and computer data information. Fiber optic cables designed for indoor, outdoor, or indoor/outdoor applications may include one or more ripcords and may include one or more binders.

Ripcords are typically used by craftsmen to rip an armor tape of the cable and/or the cable jacket, whereby the tear facilitates removal of the armor tape and/or cable jacket. To avoid breakage of the ripcord during the ripping action, a typical ripcord is preferably made of a high-strength material having a suitable weight, i.e. denier. A denier is a unit of weight per length (grams per 9000 meters) of material for measuring the fineness of threads, yarns, and the like. Binders are tape-like members which are typically used in a fiber optic cable to bind groups of cable components together. For example, one or more binders may be stranded around a cable core member having buffer tubes to hold the cable core member together prior to the extrusion of a cable jacketing material about the core member. Moreover, one or more binders may be used to retain a water swellable tape about a core member prior to the cable jacketing operation. Additionally, binders may be stranded about groups of optical fibers to form optical fiber bundles. When it is desired to gain access to the buffer tubes and optical fibers therein, a craftsman typically must use a cutting tool to cut the binders and water swellable tape. The use of a cutting tool, however, is time consuming, may create the potential for injury to the craftsman, and inadvertent damage to the buffer tubes or other cable components may occur.

There are known fiber optic cables which include at least one ripcord. U.S. Pat. No. 5,642,452 discloses a fiber optic cable with two ripcords. A radially outermost ripcord is located radially inwardly of strength members for ripping the strength members and an outer cable jacket. A radially innermost ripcord is located radially inwardly of an inner jacket for ripping the inner jacket. U.S. Pat. No. 5,621,841 discloses a fiber optic cable having two ripcords. The ripcords are in diametrically opposed locations relative to a center of the cable, and the ripcords are located radially inwardly of a steel tape and an outer sheath. The ripcords are arranged for ripping the armor and possibly the outer sheath as well. U.S. Pat. No. 4,913,515 discloses a fiber optic cable with a glass or aramid fiber ripcord located radially inwardly of optical fibers embedded in a plastic jacket. The ripcord is operative to rip the plastic jacket, and the fiber optic cable may then be unrolled to define an optical fiber ribbon. U.S. Pat. No. 5,268,983 discloses a fiber optic cable with two ripcords. A radially outermost nylon ripcord is located radially inwardly of an outer jacket for ripping the outer jacket. A radially innermost ripcord is part of a core-tube jacket for ripping the core-tube jacket. U.S. Pat. No. 5,029,974 discloses a fiber optic cable with a high-strength ripcord for ripping an armor tape and a cable sheath. U.S. Pat. No. 5,173,961 discloses a fiber optic cable with two ripcords which lie partly within a metallic cable sheath and partly outside of the metallic cable sheath by extending between overlapping edges of the metallic sheath. U.S. Pat. No. 5,321,788 discloses a fiber optic cable which includes a yarn or color marker under a tape, and includes two ripcords for facilitating removal of an armor tape and a cable jacket. None of the foregoing fiber optic cables include a ripcord for ripping a water blocking tape or a binder.

There are known fiber optic cables which include at least one binder. U.S. Pat. No. 5,345,526 discloses binders wrapped around fiber bundles housed in buffer tubes. In order to separate the optical fibers in the fiber bundles into individual optical fibers, the craftsman will typically use a cutting tool to cut the binders. U.S. Pat. No. 5,249,248 discloses a fiber optic cable having a core-wrap binder which functions both as a binder and as a water blocking yarn. The core-wrap binder, characterized as being a high-strength filament, is wrapped around a plastic tape. The craftsman typically must cut the high-strength filament and the tape with a cutting tool. U.S. Pat. No. 4,435,238 discloses an optical fiber cable comprising optical fibers surrounded by a tape and a binder. U.S. Pat. No. 5,165,003 discloses binders wrapped around fiber bundles embedded in a filling compound. None of the foregoing fiber optic cables with at least one binder include a ripcord for ripping a water blocking tape or a binder. However, in all of the foregoing known fiber optic cables which include at least one binder, the craftsman typically must cut the binders and the tape, if any, with a cutting tool. As noted above, however, the use of a cutting tool is time consuming, may create the potential for injury to the craftsman, and inadvertent damage to the buffer tubes or other cable components may occur. Consequently, there is a long-felt need for a solution to the problem of removing binders and tapes from fiber optic cables.

OBJECTS OF THE INVENTION

Accordingly, it is an object of the present invention to provide a fiber optic cable which includes one or more binders, but does not require the use of a cutting tool to cut the one or more binders, so that the binder removal procedure is not time consuming, and injury to the craftsman and inadvertent damage to the buffer tubes or other cable components is avoided.

It is an object of the present invention to provide a fiber optic cable which includes at least one water swellable tape, but does not require the use of a cutting tool to cut the at least one water swellable tape, so that injury to the craftsman and inadvertent damage to the buffer tubes or other cable components is avoided.

It is another object of the present invention to provide a fiber optic cable which includes a cable core with a cable core binder stranded around the cable core, a water swellable tape with a tape binder which surrounds the water swellable tape, the cable core including a ripcord therein, the ripcord being operative, upon application of a sufficient outwardly directed pulling force, to rip the cable core binder, the water swellable tape, and the tape binder.

It is yet another object of the present invention to provide a fiber optic cable having a cable core, the cable core includes a cable core binder, a fire-safety tape, a tape binder stranded around the tape, and a ripcord, the ripcord being operative, upon application of a sufficient pulling force, to rip the cable core binder, the fire-safety tape, and the tape binder.

It is another object of the present invention to provide a fiber optic cable having a binder which is susceptible of being ripped by a ripcord.

SUMMARY OF THE INVENTION

In achieving the foregoing objectives, the present invention provides a fiber optic cable having a cable core and a sheath section. The cable core includes a ripcord, the ripcord being operative, upon application of a sufficient pulling force, to rip a cable core binder stranded around buffer tubes of the cable core. Additionally, the ripcord is operative to rip a water swellable tape and a tape binder stranded around the water swellable tape. In accordance with the present invention, a craftsman need not use a cutting tool to cut the cable core binder and/or the water swellable tape, which avoids potential injury to the craftsman and inadvertent damage to buffer tubes or other cable components. Moreover, the tape need not be of the water swellable function type, as the invention may be practiced with tapes having other functions, for example, a fire-safety tape, e.g. for flame retardance. Further, the ripcord may include a superabsorbent material.

BRIEF DESCRIPTION OF THE DRAWING FIGURES

FIG. 3 shows a section of the fiber optic cable of FIG. 2.

FIG. 4 shows an isometric view of a fiber optic cable with a ripcord according to the present invention after the ripcord has ripped the cable core binder, the water swellable or fire-safety tape, and the tape binder.

DETAILED DESCRIPTION OF THE INVENTION

Figure 1:
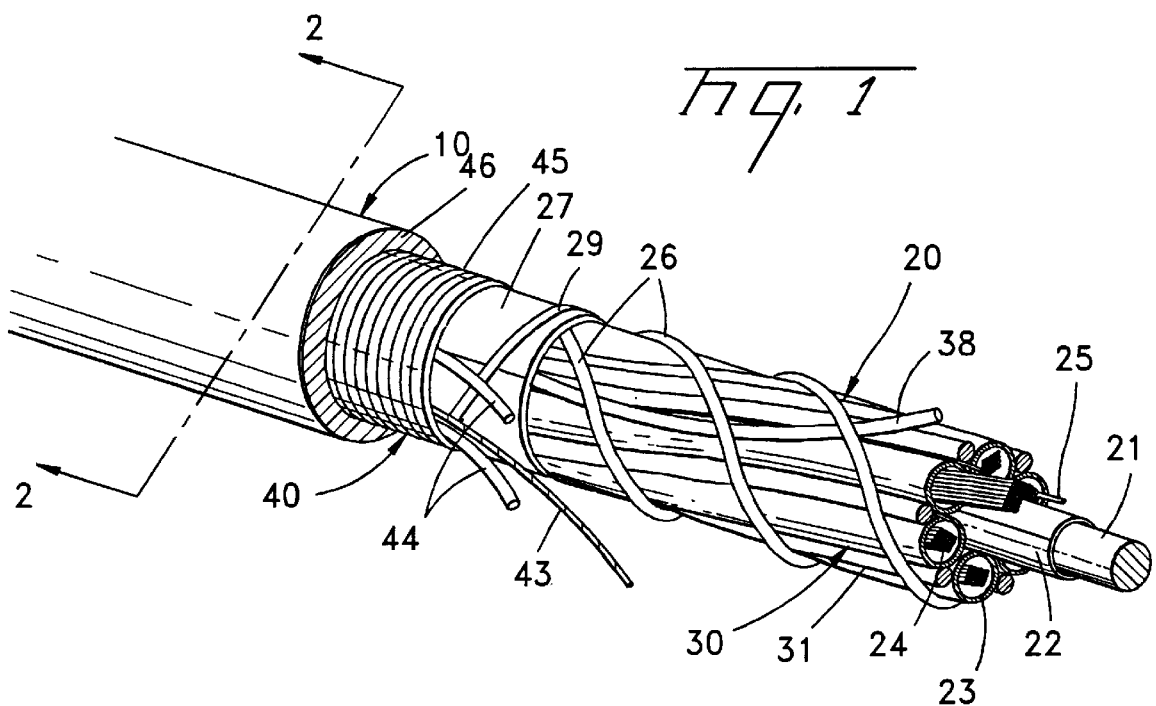
FIG. 1 shows an isometric view of a fiber optic cable according to the present invention.
Figure 2:
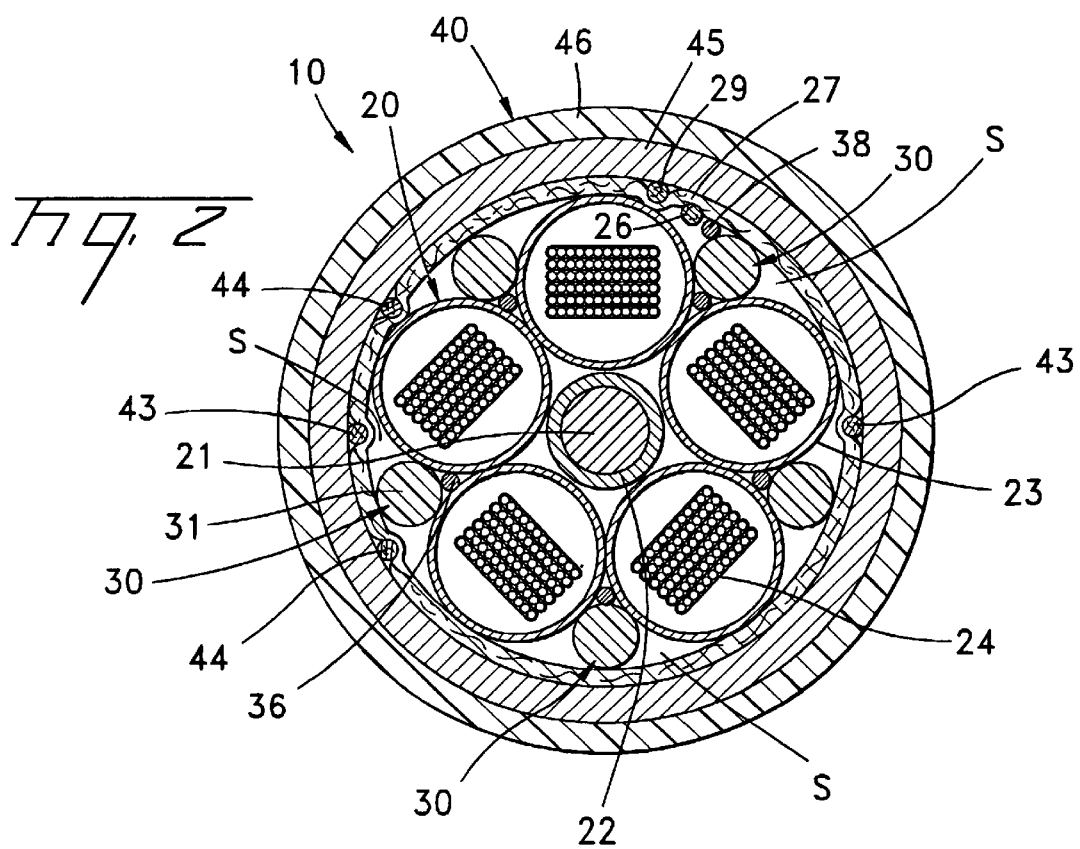
FIG. 2 shows a cross sectional view of the fiber optic cable of FIG. 1 taken along line 2—2.

Referring to FIGS. 1–4, a fiber optic cable 10 according to a preferred embodiment of the present invention will be described. Fiber optic cable 10 includes a cable core 20 and a sheath section 40. Core section 20 includes buffer tubes 23 with a cable core binder 26 stranded therearound, a water swellable tape 27 surrounds binder 26, and a tape binder 29 is stranded around water swellable tape 27. Cable core 20 includes interstitial assemblies 30 disposed in respective interstices S (FIG. 2). According to a preferred embodiment of the present invention, at least one of interstitial assemblies 30 includes a ripcord 38 located radially inwardly of cable core binder 26. Ripcord 38 is operative to, upon application of a sufficient outwardly directed pulling force, rip cable core binder 26, water swellable tape 27, and tape binder 29, thereby obviating the need for a cutting tool to do the same. Not using a cutting tool saves time and avoids potential injury to the craftsman and inadvertent damage to buffer tubes or other cable components.

Cable core 20 includes a central strength member 21 formed of a dielectric material. Central strength member 21 is surrounded by a conventional water swellable tape 22. A plurality of buffer tubes 23 surround tape 22. Each buffer tube 23 includes optical fiber ribbons 24 with optical fibers 25 therein. Buffer tubes 23 are preferably S-Z stranded about central strength member 21 in a conventional S-Z stranding manufacturing process. Where the optical fiber count so requires, dielectric filler rods may be substituted for buffer tubes 23. In either event, cable core 20 is bound together by at least one cable core binder 26. Where more than one binder 26 is stranded about cable core 20, the binders may be counter-helically stranded. In the preferred embodiment, water swellable tape 27 is a spunbonded non-woven polyester tape impregnated with a superabsorbent material. The present invention, however, extends to fiber optic cables having a tape 27 with an alternative function, the alternative function tape being in lieu of or in addition to water swellable tape 27, for example, a fire-safety tape comprising a KAPTON or a TEFLON material for flame retardance. Cable core and tape binders 26,29, according to the present invention, are preferably a polyester (PBT) binder of about 1625 denier with a preferably flat or a round cross section, the combination of material and denier for binders 26,29 is advantageous because it renders cable core binder 26 strong enough to bind cable core 20 together, and tape binder 29 strong enough to retain water swellable tape 27 in its place in cable core 20, and yet binders 26,29 are susceptible to being ripped by ripcord 38 upon application of a sufficient pulling force, as is further described below.

As best shown by FIGS. 2–3, each interstitial assembly 30 comprises a cable reinforcing member, for example, a crush-strength member 31. Crush-strength member 31 is preferably a rod formed of, for example, a low or medium density polyethylene material or a polypropylene material. Interstitial assemblies 30 also comprise a conventional water swellable member, for example, a commercially available water swellable yarn 36. Water swellable yarn 36 is disposed longitudinally along crush-strength member 31.

According to the present invention, a ripcord 38 is SZ stranded in cable core 20 as part of at least one interstitial assembly 30. Alternatively, ripcord 38 is longitudinally disposed relative to a longitudinal axis of cable 10. When ripcord 38 is longitudinally disposed relative to a longitudinal axis of cable 10, to facilitate ripping of water swellable tape 27, ripcord 38 will preferably be placed at an opposed location relative to an overlap of water swellable tape 27. When ripcord 38 is SZ stranded as part of an interstitial assembly 30, it is positioned along a radially outward surface of crush-strength member 31 but generally beneath cable core binder 26. Ripcord 38 is preferably a strong material having a bright color and a suitable weight, e.g., ripcord 38 may be a 3000 denier aramid yarn, or a nylon or a polyester material of a suitable denier. According to the present invention, two variables, namely tensile material strength and denier, are respectively balanced between ripcord 38 and binders 26,29. Preferably, the present invention is practiced with a relatively strong ripcord 38 having both a relatively strong material strength and a relatively large denier, as compared to the respective tensile strengths and deniers of binders 26,29. Binders 26,29 are thereby rendered strong enough to perform their binding function; on the other hand, binders 26,29 are susceptible to being ripped by ripcord 38 upon application of a sufficient pulling force. In the preferred embodiment of the present invention, ripcord 38 is a relatively strong aramid material comprising a range of about 1.5 to 2.5 times the denier of PBT binders 26,29. The preferred denier ratio of 1.5 to 2.5 accounts for the strength ripcord 38 should embody to rip binders 26,29 and tape 27. Alternatively, depending on the relative respective strengths of the materials of ripcord 38 and binders 26,29, and the respective deniers of ripcord 38 and binders 26,29, and the resistance to ripping exhibited by tape or tapes 27, other materials and deniers of ripcord 38 and binders 26,29 may perform satisfactorily according to the teachings of the present invention. A binder 26 or 29 formed of an oriented polymer material may perform well where the binder has a strong tensile strength but yields in shear when ripped by ripcord 38. Binders 26,29 may be weakened, for example, by having perforations formed therein to facilitate ripping thereof. Additionally, ripcord 38 may be coated or otherwise treated with a superabsorbent material.

Sheath section 40 includes two ripcords 43 which are located 180 degrees apart relative to the center of fiber optic cable 10. Additionally, sheath section 40 includes tensile strength members 44. An armor tape 45 surrounds ripcord 43 and preferably eight helically stranded dielectric strength members 44. A durable jacket 46 surrounds armor tape 45. Ripcord 43 is arranged to rip armor tape 45 and jacket 46.

When it is desired to access the optical fibers in fiber optic cable 10, the cable is cut, and ripcord 43 is used to rip jacket 46 and armor tape 45. Strength members 44 are then unwrapped. Next, a sufficient pulling force is applied to ripcord 38 whereby ripcord 38 rips cable core binder 26, water swellable tape 27, and tape binder 29 for facilitating access to optical fibers 24 (FIG. 4). Testing of samples made according to the present invention have indicated that the present invention can be used in mid-span access or free end access procedures. The binders may move when the ripcord presses on them, but the ripcord nevertheless ripped them and the tape. A pressure extruded jacket performed well as the extruded jacketing material acted to fix the binders against movement as the ripcord ripped them. In view of the foregoing, a craftsman need not use a cutting tool to cut binders and/or tape, which saves time and avoids potential injury to the craftsman and inadvertent damage to buffer tubes or other cable components.

The present invention has thus been described with reference to the foregoing embodiments, which embodiments are intended to be illustrative of the inventive concept rather than limiting. Persons of skill in the art will appreciate that variations and modifications of the foregoing embodiments may be made without departing from the scope of the appended claims. For example, the ripcord and binders according to the present invention can be adapted for use with one or more binders stranded around a bundle of optical fibers (not shown).

What is claimed is:

1. A fiber optic cable, comprising:

a core section and a sheath section;

said core section comprises buffer tubes and a thread-like cable core binder that is generally helically stranded around and is generally in contact with said buffer tubes, a water swellable tape surrounding and generally in contact with said cable core binder, and a thread-like tape binder generally helically stranded around and in contact with said water swellable tape;

said core section further comprising a ripcord located radially inwardly of said cable core binder, said water swellable tape, and said tape binder, said ripcord being generally contactable with said water swellable tape whereby no jacketing material is disposed between said ripcord and said water swellable tape, upon application of sufficient pulling force said ripcord being operative to rip said core binder, said water swellable tape, and said tape binder.

2. The fiber optic cable of claim 1, said cable core binder having a denier of about 1625.

3. The fiber optic cable of claim 1, said tape binder having a denier of about 1625.

4. The fiber optic cable of claim 1, said ripcord having a denier of about 3000.

5. The fiber optic cable of claim 1, said cable core binder and said ripcord each having a respective denier value, a ripcord/core binder denier value ratio being about 1.5 to about 2.5.

6. The fiber optic cable of claim 1, one of said tape or core binders being formed of an oriented polymer material.

7. The fiber optic cable of claim 1, said ripcord being treated with a superabsorbent material.

* * * * *